United States Patent [19]

Anderson

[11] Patent Number: 5,624,213
[45] Date of Patent: Apr. 29, 1997

[54] HOLE PRODUCING ASSEMBLY

[75] Inventor: James R. Anderson, Menominee, Mich.

[73] Assignee: Evergreen Tool Co., Inc., Menominee, Mich.

[21] Appl. No.: 439,307

[22] Filed: May 11, 1995

[51] Int. Cl.⁶ ................................................ B23B 51/04
[52] U.S. Cl. .............. 408/206; 144/23; 408/124; 408/204; 408/703
[58] Field of Search ............ 408/124, 204–209, 408/201, 223–225, 703, 239 A, 226; 144/20, 21, 23

[56] References Cited

U.S. PATENT DOCUMENTS

| | | | |
|---|---|---|---|
| 2,721,592 | 10/1955 | Baker | 144/23 |
| 2,752,965 | 7/1956 | Mackay | 408/226 |
| 3,778,179 | 12/1973 | Rivas | 408/36 |
| 3,999,869 | 12/1976 | Clark et al. | 408/204 |
| 4,968,189 | 11/1990 | Pidgeon | 408/204 |

FOREIGN PATENT DOCUMENTS

| 7206 | 1/1988 | Japan | 408/204 |
|---|---|---|---|

*Primary Examiner*—Steven C. Bishop
*Attorney, Agent, or Firm*—Michael, Best & Friedrich

[57] ABSTRACT

A hole producing assembly for a power drill including an adapter having one end operationally connected to the power drill such that the power drill rotates the adapter about an axis of rotation, the other end of the adapter includes a threaded shaft having threads that are of the four-start type, a cutter which has threads thereon that are complementary to the four-start threads on the adapter so that the cutter is threadably connectable to the adapter, the cutter has a cutting projection extending from the base and terminating in a cutting edge, and a spacer positioned between on the shaft of the adapter to aid in removal of the cutter from the adapter after use. The hole producing assembly can also be used in a nested cutter mode wherein a second cutter is threaded onto the shaft of the adapter, or with a speed reducer such that the cutter or nested cutters rotate at a speed slower than the rotational speed produced by the drill motor, or can be used with an arbor extension to drill holes in hard to reach materials.

34 Claims, 3 Drawing Sheets

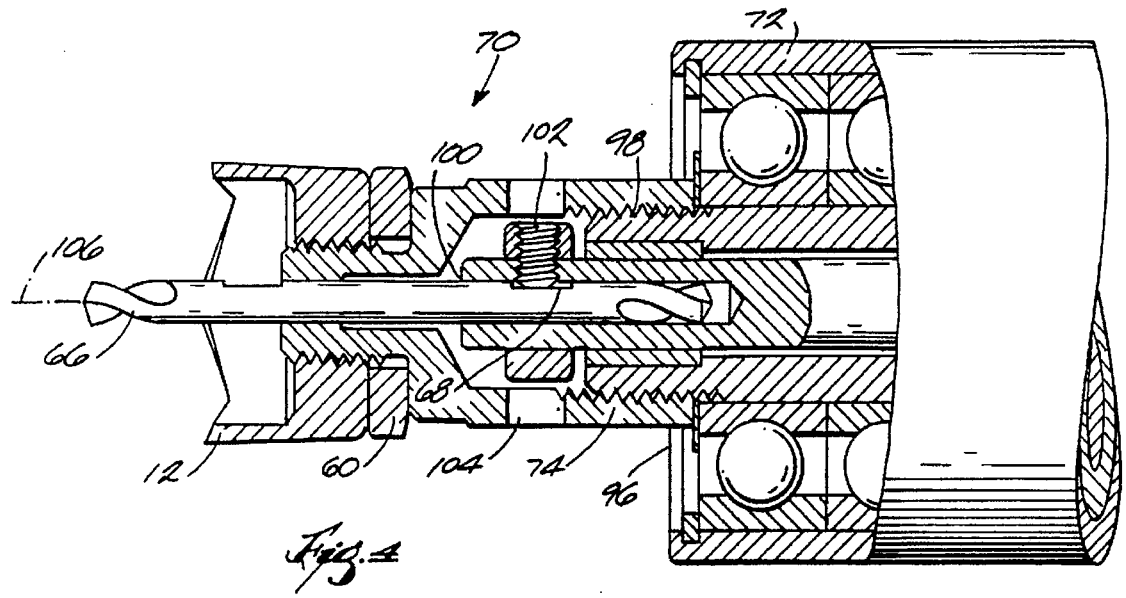
Fig. 1
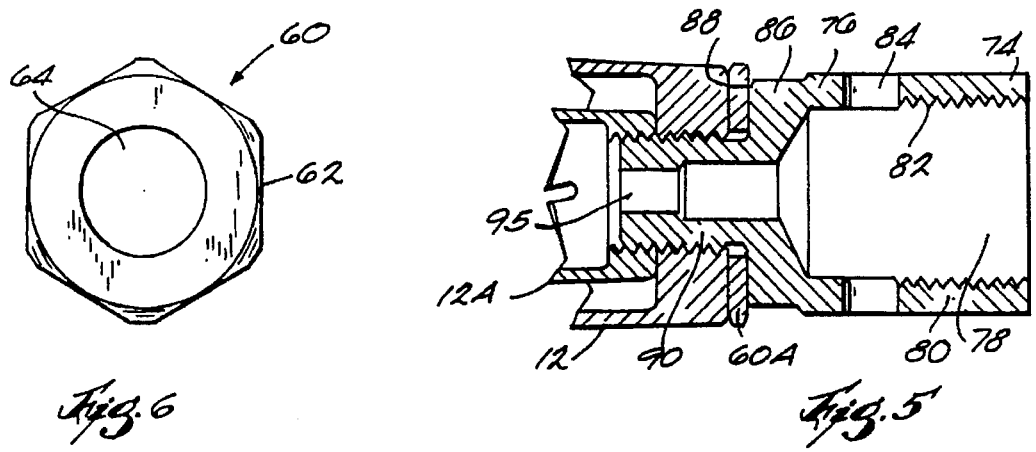
Fig. 6
Fig. 5
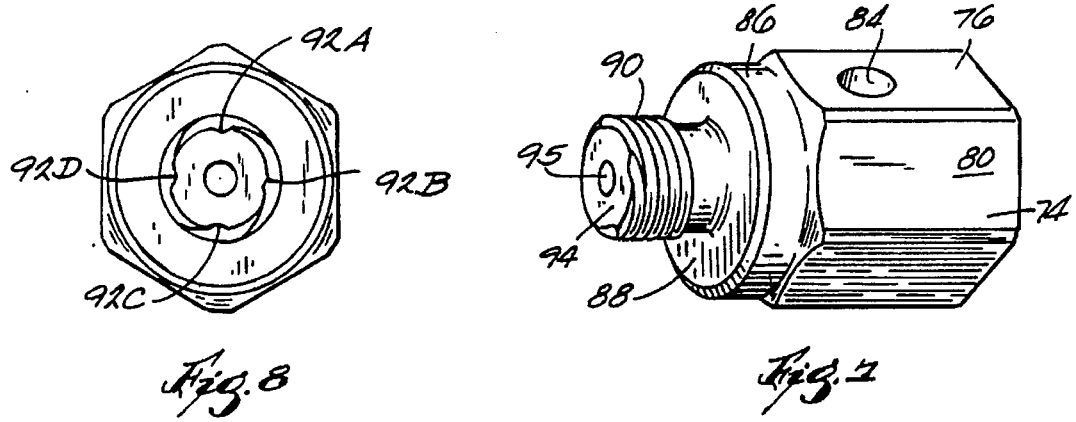
Fig. 8
Fig. 7

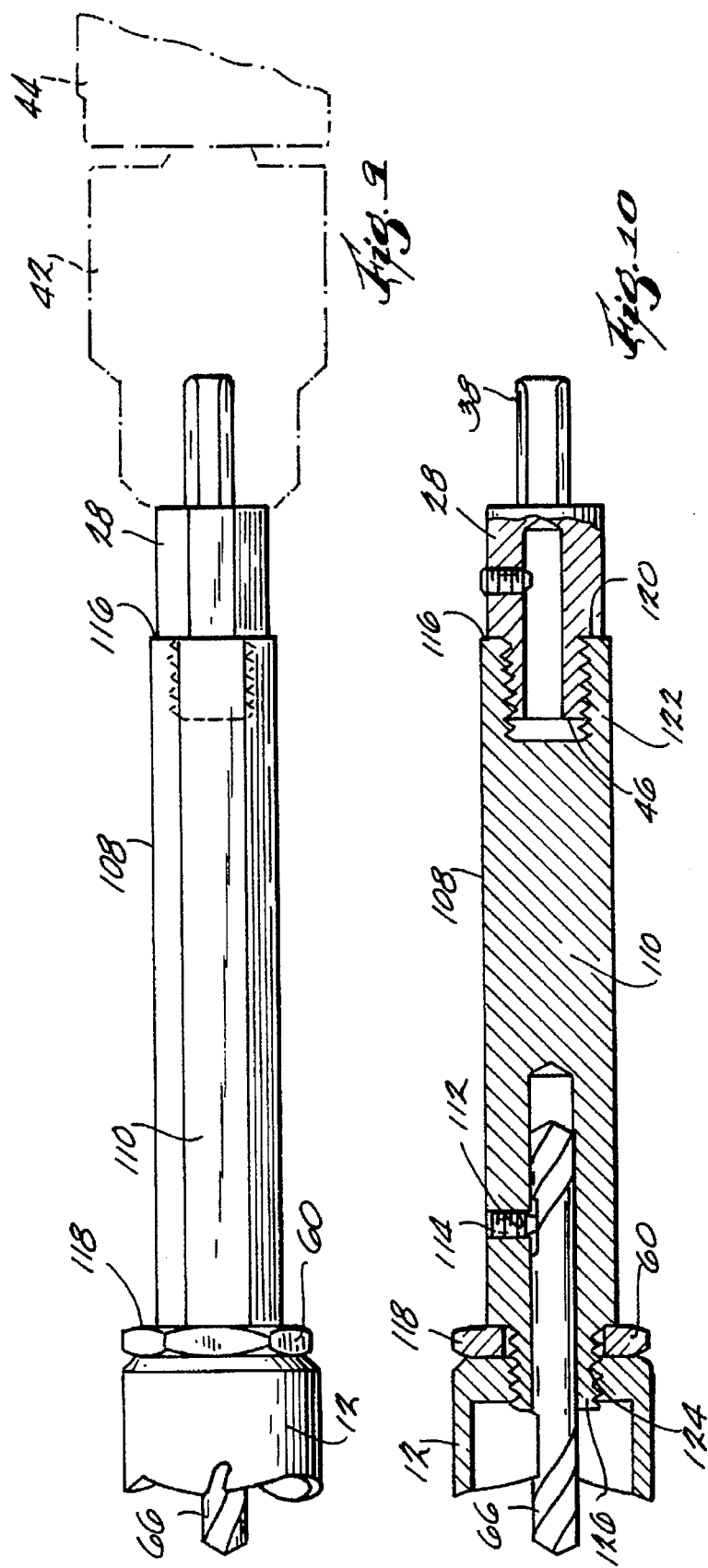

HOLE PRODUCING ASSEMBLY

FIELD OF THE INVENTION

The invention relates to a hole producing assembly, and more particularly, to a hole cutter for use with a power drill to produce a hole or enlarge an existing hole.

BACKGROUND OF THE INVENTION

Hole cutters, also termed hole saws, typically consist of a cylindrical cutter that is secured to the chuck of a power drill by an adapter. The adapter may have a threaded stub onto which the cutter is threaded. After use, the cutter can become difficult to remove because it has been further threaded onto the stub by rotational forces and become wedged too tightly on the stub to be removed by hand. The threads on the stub and cutter are typically a standard one-start thread with a very gradual slope to the helical threads.

When using hole cutters, it is sometimes desired that an existing hole be enlarged. This can be a difficult operation because the larger diameter cutter needs to be centered on the existing hole. Aligning the cutter with the existing hole by eye may not be as exact as may be required.

Further, in some applications, the material to be drilled is in a hard to reach location such that the environment surrounding the material prevents a standard power drill with a hole cutter attached to the chuck to reach the material to be drilled.

SUMMARY OF THE INVENTION

The invention provides a hole producing assembly for a power drill. The assembly includes an adapter having one end that is secured to the power drill such that the power drill rotates the adapter about an axis of rotation. The other end of the adapter includes a threaded shaft having threads that are of the four-start type. The assembly also includes a hole cutter having a base which has therethrough a bore defined by an annular wall. The wall has threads which are complementary to the four-start threads on the adapter so that the cutter can be threadably connected to the adapter. The cutter has an annular cutting projection extending from the base and terminating in a cutting edge. A spacer is also positioned on the shaft of the adapter to aid in removal of the cutter from the adapter after use.

The invention can also be used in a nested cutter mode to, for example, enlarge an existing hole. The adapter, cutter and spacer are used as above, however, a second cutter is threaded onto a portion of the shaft of the adapter that extends outwardly from the base of the first cutter. The second cutter has a diameter that is less than the diameter of the first cutter such that the second cutter abuts and is nested within the first cutter.

The hole producing assembly of the present invention can be used with a speed reducer. The speed reducer is secured to the output shaft of the drill. An adapter is secured to a rotating member on the speed reducer so that the adapter is selectively connectable to the rotating member for rotation therewith. The adapter has a threaded shaft to which the cutter and spacer, or nested cutters and spacer, are threadably connectable. In this arrangement and because of the speed reducer, the cutter, or nested cutters, rotate at a speed slower than the speed at which the output shaft of the drill is rotating. A pilot drill bit can also be utilized with the speed reducer such that when the pilot drill bit is secured to the speed reducer, the pilot drill bit rotates at the same speed as the output shaft of the drill.

Finally, the invention also includes a hole producing assembly for attachment to a power drill which is useful for hard to reach surfaces. The assembly includes an adapter and an arbor extension. The arbor extension has an elongate body and first and second ends. The first end includes an aperture defined by a cylindrical wall. The wall has threads such that the arbor extension can threadably interengage with a threaded shaft of the adapter. The second end of the arbor extension includes a threaded shaft having the same dimensions and threading as the threaded shaft of the adapter. A cutter and spacer, or nested cutters and spacer, can then be positioned on the shaft of the arbor extension as above.

Other features and advantages of the invention will become apparent to those of ordinary skill in the art upon review of the following detailed description, claims, and drawings.

BRIEF DESCRIPTION OF THE DRAWINGS

FIG. 4 is a sectional view of a second embodiment of the hole producing assembly secured to a speed reducer;

FIG. 5 is a sectional view of the adapter, spacer and nested cutters;

FIG. 6 is a plan view of the spacer;

FIG. 7 is a perspective view of an alternative embodiment of the adapter;

FIG. 8 is an end view of the adapter and spacer;

FIG. 9 is a side view of an arbor extension, with spacer and cutter, secured to a drill; and FIG. 10 is a sectional view of the arbor extension, arbor, spacer and cutter.

Figure 1:
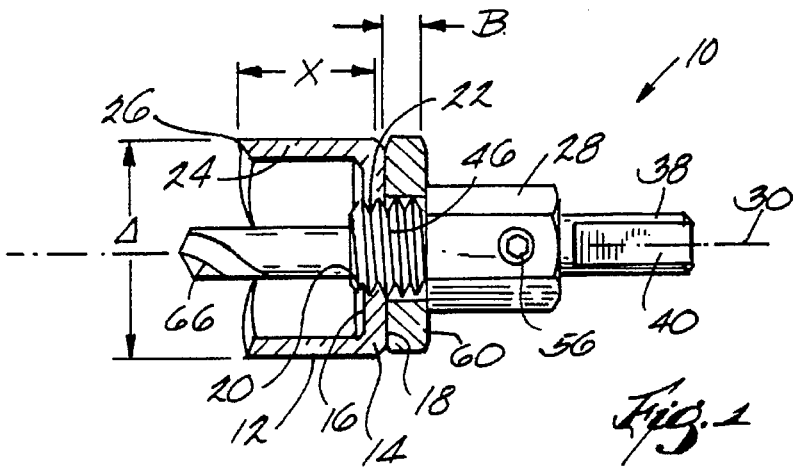
FIG. 1 is a sectional view of the hole producing assembly embodying the invention, including an adapter, spacer and cutter.

Before one embodiment of the invention is explained in detail, it is to be understood that the invention is not limited in its application to the details of construction and the arrangement of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DETAILED DESCRIPTION OF THE PREFERRED EMBODIMENT

Referring now to the drawings, there is shown in FIG. 1 the first embodiment of the hole producing assembly 10. The assembly 10 includes a hole cutter 12. The cutter 12 has an annular base 14 having a first surface 16, a second surface 18, an axial length X and a diameter D. The base 14 has a central bore 20 that is defined by a cylindrical wall 22. The cylindrical wall 22 is threaded. Extending from the periphery of the base 14 is an annular cutting projection 24. The cutting projection 24 terminates in a cutting edge 26. The cutting projection 24 can including any arrangement of cutting teeth. Preferably, the cutting projection 24 includes three cutting teeth, each having an adjacent raker tooth as is more fully described in co-pending application entitled "Cylindrical Cutter", Ser. No. 08/439,384, filed May 22, 1995, which is incorporated herein by reference.

Figure 2:
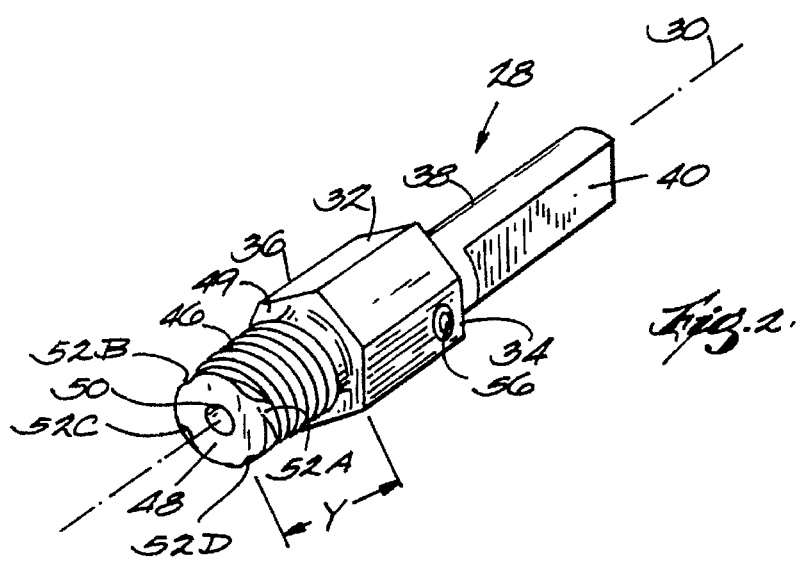
FIG. 2 is a perspective view of the adapter.
Figure 3:
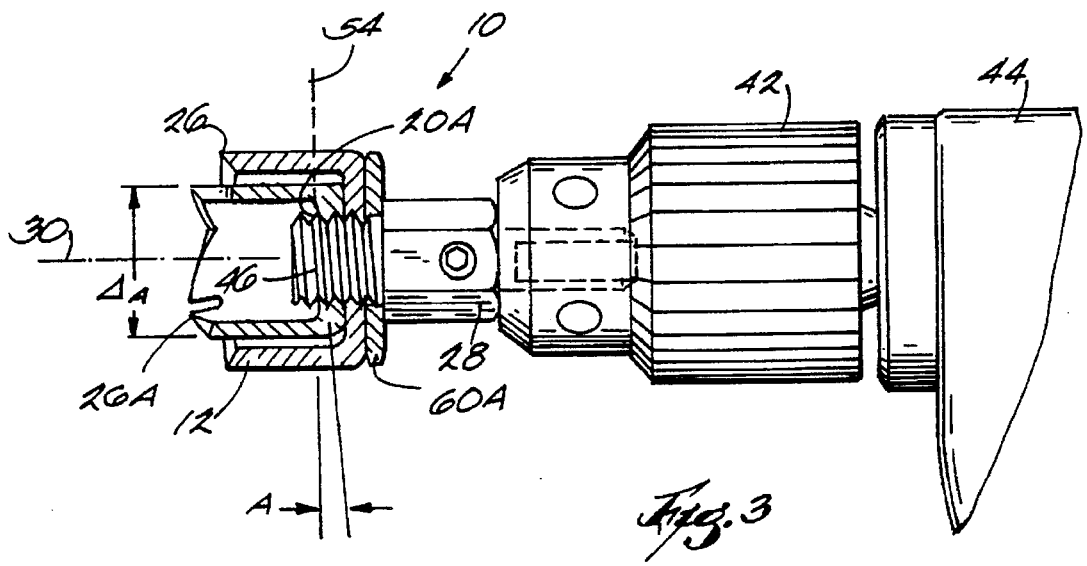
FIG. 3 is a partial sectional view of the hole producing assembly secured to a power drill.

As shown in FIGS. 1 and 2, the hole producing assembly 10 also includes an adapter 28. The adapter 28 includes an axis of rotation 30 about which the adapter 28 rotates. The adapter 28 has a generally cylindrical body 32 having first and second ends 34 and 36. A shaft 38 extends from the first end 34 of the body 32 and has therearound three flats 40, only one of which is shown in FIGS. 1 and 2. The flats 40 are utilized to secure the adaptor 28 in a chuck 42 of a power drill 44 (FIG. 3). A second shaft 46 extends from the second end 36 of the body 32 and has an end 48. The shaft 46 is of a smaller diameter than body 32 so that a shoulder 49 is formed on the end 36 of the body 32. The shaft 46 has a predetermined length Y. The shaft 46 has an aperture 50 exposed at the end 48. On its outer surface, the shaft 46 is threaded in that the threads are four-start threads. As best shown in FIGS. 2 and 8, instead of one thread that spirals downwardly on the shaft 46 from the end 48 towards the body 32, the shaft 46 includes four threads 52A, 52B, 52C, 52D. Each of the four threads 52A, 52B, 52C and 52D starts at the end 48 and spirals downwardly on the shaft 46 towards the body 32. Referring to FIG. 3, with such four-start threads, the angle A of the spiralling threads 52A, 52B, 52C, 52D, with respect to an axis 54 perpendicular to the axis of rotation 30, is steeper or greater than with a conventional one-start thread. The steeper angle A of the threads 52A, 42B, 52C and 52D enables more torque to be transmitted through the four-start threads. Further, there is more of a vector between the spirals of each of the four-start start threads such that there is less tendency for a cutter threaded onto a shaft with such threads to become over tightened and wedged on the shaft. It should be noted that the threading on the wall 22 of the cutter 12 is complementary to that on the shaft 46 of the adaptor 28 so that the cutter 12 can be threaded onto the shaft 46.

Referring back to FIG. 2, the body 32 of the adapter includes an access bore 56 that communicates with the aperture 50. The access bore 56 has therein a set screw (not shown).

As shown in FIG. 1, the hole producing assembly 10 also includes a spacer 60. The spacer 60 is annular and preferably of hexagonal shape such that the spacer 60 has at least one linear edge 62 on its periphery (FIG. 6). The spacer 60 has a central aperture 64 having a diameter that is slightly larger than the diameter of the shaft of the adapter 28. As will be discussed in more detail below, the spacer 60 can be of varying thickness. As shown in FIG. 1, the spacer has a thickness B.

Continuing to refer to FIG. 1, the spacer 60 is positioned on the shaft 46 such that the shaft 46 is within the aperture 64. Thereafter, the cutter 12 is threaded onto the shaft 46 clockwise and hand tightened. If a pilot drill bit is to be used, such as is shown in FIG. 1, the bit 66 is positioned in the aperture 50 of the adapter 28 such that a flat (not shown) on the bit 66 aligns with the set screw. A tool such as a hex wrench is inserted into the access bore 56 and is used to tighten the set screw and secure the bit 66 in this position. In this arrangement, the pilot drill 66 bit is co-axial with the axis of rotation 30 of the adapter 28 and the cutter 12 is concentric with the bit 66. The bit 66 aids in centering the hole to be drilled by the cutter 12. The bit 66 also keep the cutter 12 centered on the material to be drilled and thus prevents the cutter 12 from straying from the desired drilling position upon contact with the material.

To remove the cutter 12 from the adapter 28, the linear edges 62 of the spacer 60 are gripped by hand and rotated counterclockwise. The spacer 60 and the four-start threads 52A, 52B, 52C and 52D of the shaft 46 make removal of the cutter 12 from the shaft 46 easier in that less force is required to remove the cutter 12 and removal can be done by hand.

Referring now to FIG. 3, the hole producing assembly 10 is secured to a drill 44. The drill 44 can be any type of conventional power drill such as, for example, a variable speed-reversing 0–1000 rpm drill. The shaft 38 of the adapter 28 is positioned in the chuck 42 of the drill and secured in any conventional manner using the flats 40, such as with the use of a chuck key (not shown). The adapter 28 and the cutter 12 rotate about the axis of rotation 30 at the speed at which the motor of drill 44 is rotating the chuck 42.

In applications in which a preexisting hole needs to be enlarged, the hole producing assembly 10 includes a nested cutter arrangement. When a hole is to be enlarged, a first cutter 12 as described above having the diameter of the hole to be drilled is selected. A second cutter 12A having a diameter $D_A$ that is the same as the diameter of the existing hole is also selected. As shown in FIG. 3, the second cutter 12A is identical to the first cutter 12 except that the second cutter 12A is smaller so that it can be nested within the first cutter 12. However, the second cutter 12A has a bore 20A that is the same size as the bore 20 of the first cutter 12. In this manner, both cutters 12 and 12A can be threaded into the same shaft 46 of the adapter 28.

It should be noted that the second cutter 12A could also be used singly in the arrangement as shown in FIG. 1. Thus, only one set of cutters of varying cutting diameters are needed and can be nested in any combination.

With reference to FIG. 3, the spacer 60 and first cutter 12 are positioned on the shaft 46 of the adapter 28 as previously described. The shaft 46 is of a sufficient length such that after the first cutter 12 is threaded onto the shaft 46 and abuts the shoulder 49, a portion of the shaft 46 extends outwardly from the base 14 of the first cutter 12. Preferably, the shaft 46 is of such a predetermined length Y that, as shown in FIG. 1, with the use of the spacer 60 having thickness B, there is no portion of the shaft 46 that extends from the base 14 of the cutter 12. With the nested cutter arrangement as shown in FIG. 3, preferably a spacer 60A having a thickness $B_A$ is used such that after the first cutter 12 is threaded onto the shaft 46, a portion of the shaft 46 extends from the base 14 of the first cutter 12. Alternatively, for this nested cutter arrangement, the length Y of the shaft 46, the axial length of both cutters, as well as the thickness of the spacer 60 can be varied accordingly so that a portion of the threaded shaft 46 of the adapter 28 extends outwardly from the base 14 of the first cutter 12 after the first cutter 12 has been threaded onto the shaft 46.

Continuing to refer to FIG. 3, after the spacer 60A and first cutter 12 have been positioned on the shaft 46, the second cutter 12A is threaded onto the remaining portion of the shaft 46 and hand tightened. In these positions, the second cutter 12A is nested within the first cutter 12 and the cutting edge 26A of the second cutter 12A extends outwardly of the cutting projection 24 of the first cutter 12.

In this nested cutter mode as shown in FIG. 3, the second cutter 12A can be aligned with the existing hole, and further downward movement of the drill 44 ensures concentric alignment of the second cutter 12A about the preexisting hole to therefore align the first cutter 12 and enlarge the preexisting hole in a true concentric manner. The second cutter 12A also prevents the cutter 12 from straying from the desired drilling position upon contact with the material.

In a second embodiment of the hole producing assembly as shown in FIGS. 4–5 and 7–8, the assembly 70 is attached to a power hand drill (not shown) via a speed reducer 72.

The speed reducer 72 is designed to rotate the cutter 12, or a nested cutter arrangement 12 and 12A, at a speed slower than the speed at which the motor of the drill is rotating the motor's output shaft.

Referring now to FIG. 4, there is shown the hole producing assembly 70 which includes the previously described cutter 12 and spacer 60. The assembly further includes an adapter 74 as best shown in FIGS. 5 and 7. The adapter 74 includes a hexagonal shaped body 76 having therein an aperture 78 defined by an annular wall 80. The interior 82 of the wall 80 is threaded. An access bore 84 extends through the wall 80. A boss 86 extends outwardly from the wall 80 and has thereon an annular shoulder 88. A shaft 90 extends outwardly from the boss 86. The shaft 90 is threaded and particularly has thereon threads of the four-start type 92A, 92B, 92C and 92D (FIG. 8), as previously described above with respect to the first embodiment. The adapter 74 also includes a bore 95 in the shaft 90 that communicates with the aperture 78. The threading on the cutter 12 corresponds to and is interengageable with the threading on the shaft 90 of the adapter 74. The shaft 90 terminates in an end 94.

As previously described with respect to the first embodiment, the second embodiment of the hole producing assembly 70 can also be configured to include a single cutter 12 or a nested cutter arrangement 12 and 12A. In the single cutter mode as shown in FIG. 4, the spacer 60 and cutter 12 are secured to the adapter 74. In the nested cutter mode as shown in FIG. 5, a second cutter 12A can be threaded onto the shaft 90 of the adapter 74 having already had the spacer 60A and first cutter 12 threaded thereon.

The second embodiment of the hole producing assembly 70 is designed to be secured to the speed reducer 72 as is partially shown in FIG. 4. The speed reducer 72 can be of any in-line type, and, for example, the speed reducer 72 can be of the planetary gear type as is more fully described in co-pending application entitled "Speed Reducer Assembly", Ser. No. 08/439,386, filed May 11,1995, which is incorporated herein by reference. One end of the speed reducer 72 is secured to the output shaft of the drill (not shown). As shown in FIG. 4, the other end 96 of the speed reducer 72 includes a rotatable threaded hub 98. The threaded hub 98 includes a bore 100 for housing a drill bit 66 such as pilot drill bit. The drill bit 66 has thereon a flat portion 68. The hub 98 also includes a set screw 102 for securing the bit 66 in the bore 100 with access to that set screw 102 being through the bore 104 in the adapter 74. The adapter 74 is secured to the speed reducer 72 by threading the adapter 74 onto the hub 98 of the speed reducer 72 until the adapter 74 abuts the end 96 of the speed reducer 72. The drill bit 66 is to be used, the drill bit 66 is inserted into the bore 95 of the adapter 74 and the bore 100 of the hub 98 such that the set screw 102 engages the flat portion 68 of the drill bit 66. The set screw 102 is then tightened with a tool such as a hex key wrench to secure the drill bit 66 in this position.

Continuing to refer to FIG. 4, when the speed reducer 72 is employed, the drill bit 66 rotates at the same speed as the output shaft of the drill while the speed reducer 72 causes the adapter 74 and cutter 12 to rotate about an axis of rotation 106 at a speed lower than that of the output shaft/drill bit. In some applications such as cutting holes in material such as stainless steel, it is desired that the cutter 12 rotate at a slower speed with no loss of torque which can be provided by the speed reducer 72.

In a third embodiment of the invention, if it is desired to extend the reach of the drill to enable access to hard to reach materials, an arbor extension 108 as shown in FIGS. 9 and 10 can be utilized. The arbor extension 108 includes a main elongate body 110 having therein a bore 117 that houses a set screw 114. The body has first and second ends 116 and 118. A bore 120 defined by cylindrical wall 122 is located on the first end 116 of the arbor extension 108. The wall 122 is threaded. Located on the second end 118 of the arbor extension 108 is a threaded shaft 124 which preferably has thereon the four-start threading previously discussed. A central bore 126 is located within the shaft 124 and communicates with the aperture 112.

Continuing to refer to FIGS. 9–10, to use the arbor extension 108, the adapter 28 as previously described is employed. Preferably, the shaft 124 of the arbor extension 108 has the same dimensions as the shaft 46 of the adapter 28. The shaft 46 of the adapter 28 is threaded into the bore 120 of the arbor extension 108. The shaft 38 of the adapter is secured in the chuck 42 of the power drill 44 (FIG. 9). A spacer 60 and cutter 12 are threaded onto the shaft 124 of the arbor extension 108. If desired, a pilot drill bit 66 can be utilized. The pilot drill bit is inserted into the bore 126 of the arbor extension 108 and secured by rotation of the set screw 114 using a conventional tool such as a hex wrench such that the screw abuts a flat 68 on the pilot drill bit 66. Alternately, a nested cutter arrangement can be utilized with the arbor extension 108 (not shown).

If additional length is needed, two or more arbor extensions 108 can be stacked to achieve the desired length by threadably connecting the shaft 124 of one arbor extension 108 to the bore of an adjacent arbor extension. The adapter 28 and arbor extensions 108 are dimensioned such that these parts are interconnectable for using one or more in combination.

We claim:

1. A hole producing assembly for use with a power drill including a motor having an output shaft, said assembly comprising:

an adapter having an axis of rotation and first and second ends, said first end adapted to be operably connected to the motor such that the motor causes said adapter to rotate about said axis of rotation, said second end including a threaded shaft;

a first cutter having a base, said base having first and second surfaces and having therein a bore extending from said first surface to said second surface, said base being threadably connectable to said threaded shaft of said adapter, said first cutter including a cutting projection extending from said first surface, said base having a diameter with respect to a plane transverse to said bore; and a second cutter having a base and a cutting projection, said base of said second cutter having therein a bore, said base of said second cutter having a diameter with respect to a plane transverse to said bore of said second cutter less than said diameter of said first cutter, said base of said second cutter being threadably connectable to said threaded shaft of said adapter such that said second cutter abuts said first surface of said first cutter.

2. The hole producing assembly as set forth in claim 1 wherein said second cutter extends forwardly of said cutting projection of said first cutter in a direction away from said shaft.

3. The hole producing assembly as set forth in claim 1 wherein said adapter includes a bore that is co-axial with said axis of rotation, wherein said assembly further includes a drill bit, and wherein said drill bit is removably housed in said bore of said adapter.

4. The hole producing assembly as set forth in claim 1 wherein said shaft is threaded with four-start threads.

5. The hole producing assembly as set forth in claim 1 wherein said adapter includes a shoulder, and wherein said assembly further includes a spacer positioned between said shoulder and said second surface of said first cutter.

6. The hole producing assembly as set forth in claim 1 wherein said first end of said adapter includes a shaft that is adapted to be removably secured to the drill.

7. The hole producing assembly as set forth in claim 1 wherein said first end of said adapter includes a shaft, wherein the drill includes a chuck, and wherein said shaft is adapted to be removably secured to the chuck for rotation therewith.

8. The hole producing assembly as set forth in claim 1 and further including a speed reducer securable to the drill, wherein said first end of said adapter is secured to said speed reducer, and wherein said speed reducer rotates said first and second cutters at a speed slower than the motor is rotating the output shaft.

9. A hole producing assembly for use with a power drill, said assembly comprising:

an adapter including a body, a threaded shaft and an axis of rotation, said adapter adapted to be operably connected to the drill such that the drill rotates said adapter about said axis of rotation;

a cutter having a base having therethrough a bore defined by a wall, said wall having thereon threads complementary to said threads of said adapter so that said cutter is threadably connectable to said shaft, said cutter including a cutting projection extending from said base;

wherein said threading of said shaft and said threading of said wall are of the four start type; and a spacer positioned between said body and said cutter, said spacer having a periphery and including at least one linear edge on said periphery.

10. The hole producing assembly as set forth in claim 9 and further including a second cutter having therein a bore defined by a threaded wall, having thereon threads complementary to said threads of said adapter so that said cutter is threadably connectable to said shaft and said second cutter abuts said cutter.

11. The hole producing assembly as set forth in claim 10 wherein said second cutter includes a base and a cutting projection extending from said base, said cutting projection of said second cutter terminates in a cutting edge, and wherein said cutting edge of said second cutter is spaced outwardly from said cutting projection of said cutter in a direction opposite to said adapter.

12. The hole producing assembly as set forth in claim 9 wherein said adapter includes a bore, wherein said assembly further includes a drill bit, and wherein said drill bit is removably housed in said bore of said adapter.

13. The hole producing assembly as set forth in claim 9 wherein said adapter includes a shank and wherein said shank is removably securable to the drill.

14. The hole producing assembly as set forth in claim 9 and further including a speed reducer securable to the drill, wherein said adapter is secured to said speed reducer, and wherein said speed reducer causes said adapter and said cutter to rotate about said axis of rotation at a speed slower than the motor speed of the drill.

15. The hole producing assembly as set forth in claim 10 and further including a speed reducer securable to the drill, wherein said adapter is secured to said speed reducer, and wherein said speed reducer causes said adapter, cutter and second cutter to rotate at a speed slower than the motor speed of the drill.

16. The hole producing assembly as set forth in claim 9 and further including a speed reducer securable to the drill, wherein said adapter is secured to said speed reducer, wherein said speed reducer has a bit receiving opening, wherein said assembly further includes a drill bit removably housed in said opening, and wherein said speed reducer causes said cutter to rotate about said axis of rotation at a speed slower than the speed at which said speed reducer rotates said drill bit.

17. A hole producing assembly for use with a power drill comprising an adapter having a shoulder and a threaded end;

a cutter having a base, said base being threaded and in threaded engagement with said end of said adapter so that said cutter is rotatable with said adapter, said cutter including a cutting projection extending outwardly from said base and terminating in a cutting edge; and a spacer positioned on said threaded end of said adapter between said base of said cutter and said shoulder of said adapter, said spacer having at least one linear edge.

18. The hole producing assembly of claim 17 wherein said cutter is generally cylindrical, wherein said base forms a generally closed inner end, and wherein said cutter includes a cylindrical wall extending from said base and terminating in a cutting edge to provide said cutting projection.

19. The hole producing assembly of claim 17 wherein said threaded end of said adapter has therein a bore and wherein said assembly further includes a drill bit removably positioned in said bore.

20. The hole producing assembly of claim 17 wherein said threaded end of said adapter has a predetermined length, wherein said base of said cutter has an axial length, and wherein said predetermined length of said threaded end being greater that said axial length of said base so that a portion of said threaded end extends axially beyond said base for a distance less than the extension of said cutting projection.

21. The hole producing assembly of claim 20 wherein said assembly further includes a second cutter having a base threadable onto said portion of said end of said adapter extending beyond said base of said first cutter.

22. The hole producing assembly of claim 17 wherein said spacer is clearance fit onto said end of said adapter.

23. A hole producing assembly for attachment to a power drill having a motor and an output shaft driven by the motor, said assembly comprising:

a speed reducer having a first end adapted to be securable to the output shaft and a second end having thereon a rotatable hub, said hub having an axis of rotation about which said hub rotates when powered by the drill;

an adapter threadably connectable to said hub so that said adapter is selectively connectable to said hub for rotation therewith, said adapter having a shoulder and a threaded end;

a cutter having a base lying in a plane generally perpendicular to said axis of rotation and being threaded and in threaded engagement with said threaded end of said adapter so that said cutter is rotatable with said adapter, said cutter including a cutting projection extending outwardly from said base, said speed reducer rotates said adapter and said cutter at a speed slower than the speed at which the motor rotates the output shaft; and a spacer positioned on said threaded end of said adapter between said base of said cutter and said shoulder of said adapter.

24. The hole producing assembly as set forth in claim 23 wherein said threaded end of said adapter and said cutter is threaded using four-start threads.

25. The hole producing assembly as set forth in claim 23 wherein said assembly further includes a second cutter threadably connectable to said threaded shaft of said adapter.

26. The hole producing assembly as set forth in claim 23 wherein said speed reducer includes a bore that is co-axial with said axis of rotation, wherein said assembly further includes a drill bit, and wherein said drill bit is removably housed in said bore.

27. The hole producing assembly as set forth in claim 26 wherein said speed reducer, when energized by said motor, rotates said bit at the same speed at which the motor rotates the output shaft.

28. A hole producing assembly for attachment to a power drill, said assembly comprising:

an adapter having a shaft adapted to be rotatably secured to the drill and having a threaded stub;

an arbor extension having an elongate body and first and second ends, said first end having therein an aperture defined by a cylindrical wall, said wall having thereon threads such that said arbor extension is threadably interengageable with said stub of said adapter, said second end having thereon a threaded shaft having the same dimensions and threading as said stub of said adapter; and a cutter having a base having therethrough a bore defined by an annular wall, said annular wall having thereon threads so that said cutter is threadably connectable to said shaft of said arbor extension, said cutter including a cutting projection extending from said base and terminating in a cutting edge.

29. The hole producing assembly as set forth in claim 28 and further including a spacer positioned on said shaft of said arbor extension between said body and said cutter, said spacer having a periphery and including at least one linear edge on said periphery.

30. The hole producing assembly as set forth in claim 28 wherein said arbor extension has therein a central bore, and wherein said assembly further includes a drill bit positioned in said bore.

31. The hole producing assembly as set forth in claim 30 wherein said body includes an access bore in communication with said central bore, wherein said assembly further includes a set screw positioned in said access bore, and wherein said set screw abuts said drill bit to secure said drill bit in said central bore.

32. A hole producing assembly for use with a power tool, said assembly comprising:

an adapter including a body, a first portion adapted to be operably connected to the drill, and a second portion including a threaded shaft; and a cutter having a base having therethrough a bore defined by a wall, said wall having thereon threads complementary to said threads of said adapter so that said cutter is threadably connectable to said shaft, said cutter including a cutting projection extending from said base;

wherein said threading of said shaft and said threading of said wall are of the four start type.

33. A hole enlarging assembly as set forth in claim 32 wherein said body of said adapter includes a shoulder, and wherein said assembly further includes a spacer located between said shoulder and said cutter.

34. The hole enlarging assembly as set forth in claim 32 wherein said first portion of said adapter includes a shaft.

* * * * *